United States Patent [19]

Yunick

[11] Patent Number: 5,515,712
[45] Date of Patent: May 14, 1996

[54] APPARATUS AND METHOD FOR TESTING COMBUSTION ENGINES

[76] Inventor: Henry Yunick, 957 N. Beach, Dayton Beach, Fla. 32117

[21] Appl. No.: 261,984

[22] Filed: Jun. 17, 1994

Related U.S. Application Data

[63] Continuation-in-part of Ser. No. 876,980, May 1, 1992, abandoned.

[51] Int. Cl.⁶ ................................................. G01M 15/00
[52] U.S. Cl. ................................ 73/9; 73/19.1; 73/119 R
[58] Field of Search .............................. 73/3, 7–10, 115, 73/116, 117–117.3, 119 R, 118.1, 53.05–53.07, 61.48, 61.69, 61.59, 61.68, 61.44, 19.1, 19.11, 9

[56] References Cited

U.S. PATENT DOCUMENTS

| | | |
|---|---|---|
| 2,406,179 | 8/1946 | Walsh et al. ........................... 73/19.11 |
| 3,381,518 | 5/1968 | Loehle .................................. 73/19.11 |
| 3,552,196 | 1/1971 | Schrom . |
| 3,625,054 | 12/1971 | Vesper et al. . |
| 4,169,372 | 10/1979 | Colwill et al. . |
| 4,311,041 | 1/1982 | Reid et al. . |
| 4,331,029 | 5/1982 | Wilson . |
| 4,448,063 | 5/1984 | Mudge et al. ......................... 73/117.2 |
| 4,457,165 | 7/1984 | Wiederrich . |
| 4,458,529 | 7/1984 | Nagaishi et al. ..................... 73/118.2 |
| 4,473,537 | 9/1984 | Ford, Jr. et al. ....................... 364/500 |
| 4,475,388 | 10/1984 | Kawai et al. ......................... 73/118.1 |
| 4,483,184 | 11/1984 | Kunzfeld . |
| 4,483,185 | 11/1984 | Kunzfeld . |
| 4,505,152 | 3/1985 | Haddox . |
| 4,603,582 | 8/1986 | Middleton . |
| 4,643,022 | 2/1987 | Werlberger et al. .................. 73/117.3 |
| 4,825,569 | 5/1989 | Mears . |
| 4,848,717 | 7/1989 | Bevill ..................................... 73/116 |
| 5,060,176 | 10/1991 | Nawa et al. . |

FOREIGN PATENT DOCUMENTS 1099886  1/1968  United Kingdom ..................... 73/116

OTHER PUBLICATIONS

H. Solberg, O. Cromer, A. Spalding, *Thermal Engineering*, 210–213 (1960).
J. McFarland, *Exploring Valvetrain Dynamics*, Petersen'Circle Track, Feb. 1986. Edelbrock Brochure No. 0209.
Judge, "The Testing of High Speed Internal Combustion Engines", Chapman & Hall Ltd, 37 Essex St, 1955, pp. 460–464, 58–63.

*Primary Examiner*—R. Raevis
*Attorney, Agent, or Firm*—Watts, Hoffman, Fischer & Heinke Co.

[57] ABSTRACT

An apparatus and a method for testing internal combustion engines are disclosed. In the preferred arrangement the apparatus includes a test module supporting an electric motor for rotating an engine mounted on an engine module at speeds throughout the engine's normal operating speeds range. The engine module is mobile and releasably connectable to the test module. A torque sensor and speed sensor are coupleable to the output shaft of an engine under test. The torque sensor is connected to a display for indicating friction power. An optical measuring device is provided for measuring displacement and velocity of moving engine parts. The apparatus also includes a system for measuring air entrainment in engine lubricating oil. An air flow meter is provided for measuring air flow into and out of the engine and providing air flow readings adjusted to standard conditions.

24 Claims, 8 Drawing Sheets

APPARATUS AND METHOD FOR TESTING COMBUSTION ENGINES

This is a continuation-in-part of application Ser. No. 07/876,980 filed on May 1, 1992, now abandoned.

BACKGROUND OF THE INVENTION

1. Field of the Invention

The present invention relates to engine testers, and more particularly, to internal combustion engine testers for measuring the friction power of engines, for viewing and optically measuring the velocity and displacement of internal engine parts, for measuring air flow rates, and for observing engine fluids.

2. Description of Related Art

It is often desirable for engine builders and technicians to operate an internal combustion engine throughout its normal speed range during testing. However, an operating engine creates extreme heat and noise. In the vicinity of an operating engine, hearing protection is required, there is a danger to technicians of being burned by hot engine parts, and ventilation of the exhaust fumes is necessary. In addition, testing an operating engine wears the parts by heating and cooling them. One solution to this problem has been to use a motoring dynamometer which is a dynamometer having a motor/generator capable of rotating the engine. Thus, the engine may be rotated without combustion occurring. Existing motoring dynamometers, however, lack the power to rotate a modern racing engine at high enough speeds to duplicate its normal range of operation. Furthermore, existing motoring dynamometers are prohibitively expensive for many shops.

Engine designers often need to know the power requirements of an engine and its individual parts. Existing motoring dynamometers are capable of measuring power requirements of an engine but are typically unable to rotate modern racing engines at speeds high enough to recreate their normal operating range.

It is desirable for engine builders and technicians to observe the inner workings of an engine when performing tests. In some cases, human eye observation can detect defects or inefficiencies in moving parts and fluids. In other cases, to detect inefficiencies, a non-contacting displacement follower which uses light to measure part displacement and velocity is required due to the high speed of the parts. Whether observation is done by instrument or with the human eye, illumination of the engine part is required. In general, windows have not been used on operating internal combustion engines for illumination because of the high operating temperatures and safety concerns. In one proposal, the performance of a cam shaft was optically measured by cutting away a portion of the valve cover. A motor was connected to the cam shaft to cause it to rotate. This method failed to recreate accurately actual engine operating conditions because the entire engine was not rotated at its normal operating speeds.

There is a need for engine builders to know the flow rate of air into and out of the cylinders of an engine. One proposed method of measuring engine air flow was to perform a bench test with a device known as a flow bench. The flow bench system was connected to an engine head which had been removed from an engine. An air pump was connected to the head to create a vacuum which simulated the vacuum created by the pistons in an operating engine. A flow meter was connected to the intake ports of the head to measure the air flow through the intake valves. Measurements were taken for numerous positions of the intake valves. The air flow was reversed and a similar set of flow readings was taken for the air passing through the exhaust valves. This apparatus and method was based on an artificially created air flow which failed to accurately reproduce the vacuum and exhaust pressures created by a set of moving pistons. Moreover, the flow readings were inaccurate since they were taken while the valves were stationary. Further, test results taken at different times could not be compared reliably due to failure to compensate for variables in weather conditions. In short, this apparatus and method failed to recreate the dynamic conditions of an operating engine.

It is desirable for engine builders to know the peak pressure r.p.m. value of a cylinder. That is, the number of revolutions per minute of the engine at which the pressure inside the cylinder reaches a peak. The output torque of an engine is maximized at this speed. An attempt was made to measure this value by removing the spark plug from one cylinder and connecting a pressure gauge to the cylinder in its place. This method failed because, for one reason, the pressure pulses from the firing cylinders affected the pressure measurements. Thus, there is a need for an effective method of testing peak pressure speed.

Another problem facing engine designers, which few if any have fully recognized, is the foaming of engine oil. Moving parts of an engine mix air into the oil. The greater the amount of air mixed into the oil, the less effective it is at lubrication. It is generally impractical, unsafe and ineffective to employ an observation window to view the amount of oil foaming in an operating engine. In the absence of an effective method of measuring engine oil foaming, there has been no effective solutions to this problem.

SUMMARY OF THE INVENTION

The engine tester embodying the present invention is a multi-use apparatus for providing engine designers with much needed information about an engine's operation. Several facts have been discovered for the first time through tests conducted with the engine tester. For example, many engine technicians have been perplexed by the high frequency of timing chain breakage. Tests with the apparatus of the present invention have shown that acceleration and deceleration of the cam shaft with respect to the crankshaft periodically causes the ""pull""side to slacken. When the pull side returns to a taut condition tremendous stress is placed on the chain too often causing it to snap.

Since the test mechanism can motor an engine throughout its entire operating speed range it is now possible to conduct tests which cannot be performed with an operating engine or with any prior test mechanism. Tests performed with a prototype unit have produced some startling results. For example, the engine tester has shown technicians that simple re-routing of the coolant path will increase coolant flow enough to permit a smaller water pump to be employed, thus saving precious power. The engine tester has also shown significant volumes of air are entrained in lubricating oil when an engine is in use significantly degrading lubricating qualities of the oil. Further tests have established that paper oil filter elements introduce more air into lubricating oil than wire mesh filters, and that certain oil pumps cause more air entrainment than others. Other discoveries have been made as well and the potential for further discoveries is unlimited.

The invention embodies a method of improving the performance of an internal combustion engine comprising the following steps: connecting an output shaft of the engine"

to an output component of an electric motor of a size sufficient to rotate the shaft through a speed range substantially equal to the speed range of the engine when operated to produce output power; equipping the engine with a window positioned to permit performance observation of a selected engine component; driving the engine with the motor while observing the selected component to collect a first set of empirical engine performance data at observed speeds of engine rotation; modifying the selected component; again driving the engine with the motor; collecting further empirical data while the engine is rotated at speeds corresponding to the observed speeds; and, comparing the further data with the first set to determine whether one of the selected and modified components is superior to the other.

The discoveries with respect to entrained air and lubricating oil were made with tests conducted with a novel mechanism which forms a part of this invention. A test engine was equipped with two different oil pumps respectively mounted on opposite sides of the engine. The pumps deliver oil to the lubricating system of the engine. The engine lubrication system is sealed with a pressure relief valve and no pvc valve. The engine utilized a so called "dry sump" in that oil collected from the sump is pumped through a sight tank, (that is a tank with a sight window and graduations, so that one can measure the original volume and then increasing volume as air is entrained through oil circulation through a rotating engine).

There are duplicate systems coupled to the respective oil pumps, so that oil from the sump is selectively pumped to one of two sight tanks, each forming a part of a different duplicate system. Oil from the sight tank being utilized is pumped by its associated oil pump and then delivered through either of two filters coupled in parallel, so that one can measure and compare the amount of air entrainment induced by each of the filters. Thus, it is possible to compare air entrainment of one filter versus another in otherwise identical circumstances. By operating one of the oil pumps and then the other it is also possible to compare the efficiencies of the two pumps and the amount of air entrainment induced by each of them.

The original test system embodied a mobile frame which supported an engine to be tested, a motor to drive the engine and the various test mechanisms employed. A second prototype has been constructed of a now preferred embodiment. With the now preferred embodiment a test module supports a 300 hp electric motor, various electrical components necessary to operate the motor, a dynamometer and a mechanism selectively to couple an engine under test to the motor or the dynamometer.

A plurality of mobile engine support modules are provided. The engine support modules are selectively coupleable one at a time to the test module, so that it is possible, for example, to test a component of a first engine, move that first engine and its supporting module to a remote location for substitution of a modified component and subsequent comparison testing of the modified component, while concurrently coupling a second engine module to the test module and performing tests on the second engine.

Among the equipment provided for performing tests on an engine are:

1) a unit for optically viewing engine components through suitable transparent windows;

2) temperature and pressure measuring devices;

3) power and torque measuring devices;

4) a pyrometer;

5) a unique air flow measuring device which, for example, supplies laminar flow to an intake port under test, measures that flow and provides an output adjusted from the measured values to standard values to compensate for any variations in ambient temperature, pressure and humidity.

Accordingly, the object of the invention is to provide a novel and improved internal combustion engine testing mechanism and processes of testing such engines.

BRIEF DESCRIPTION OF THE DRAWINGS

Preferred embodiments of the invention are shown in the accompanying drawings in which.

DESCRIPTION OF THE PREFERRED EMBODIMENTS

Figure 1:
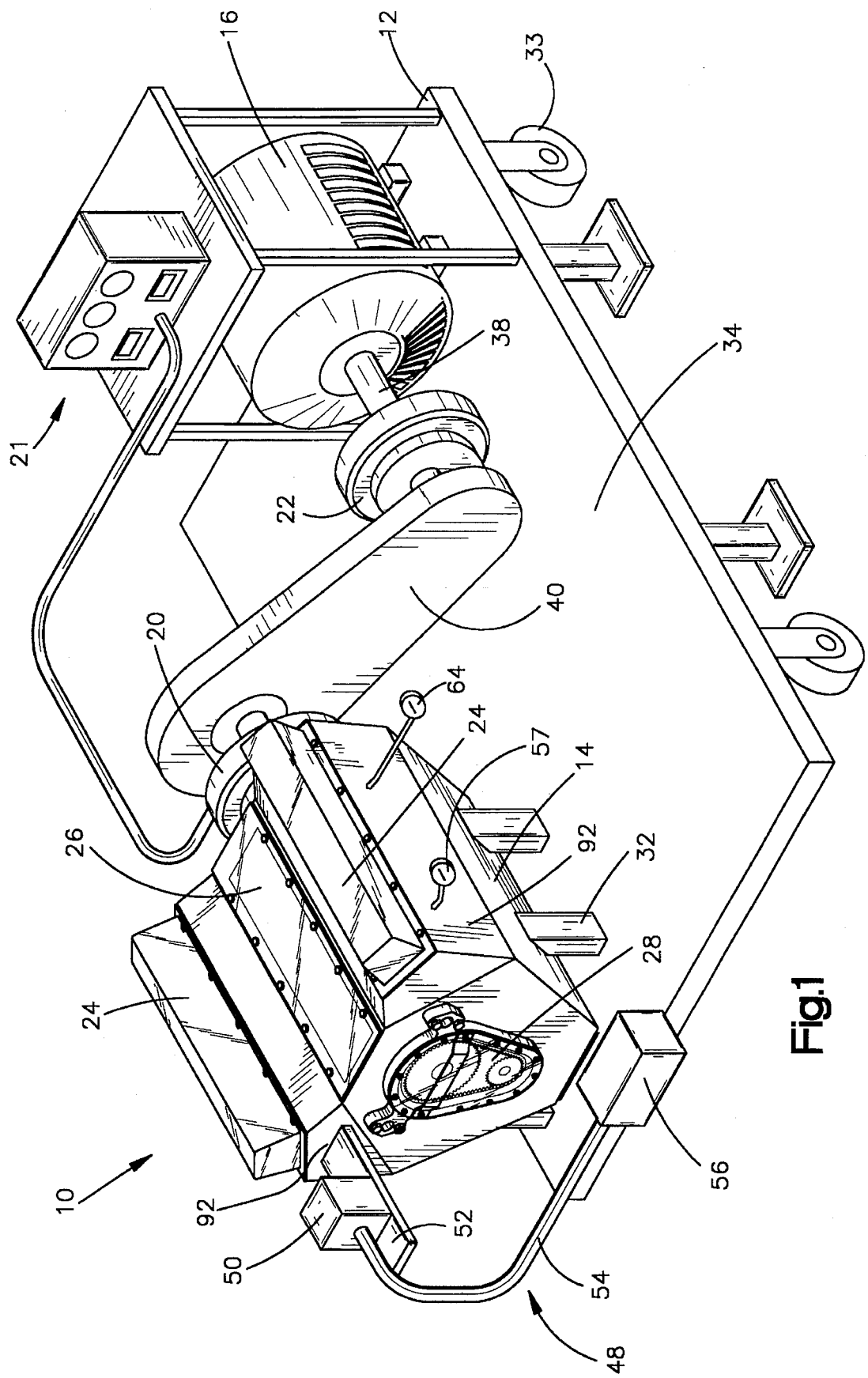
FIG. 1 is a perspective view of an engine tester embodying the present invention.
Figure 2:
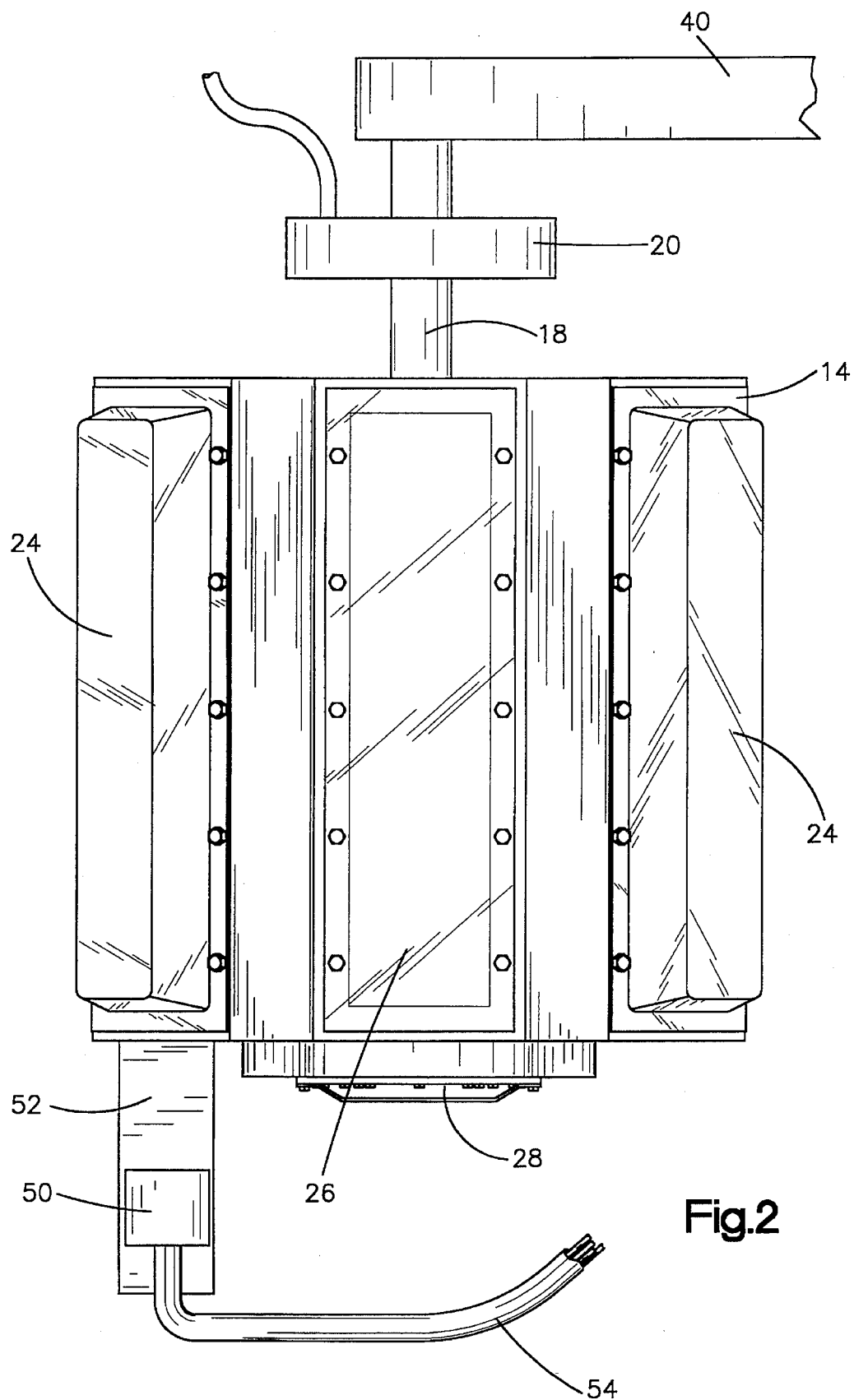
FIG. 2 is a top plan view of an engine mounted on the tester of FIG. 1.
Figure 3:
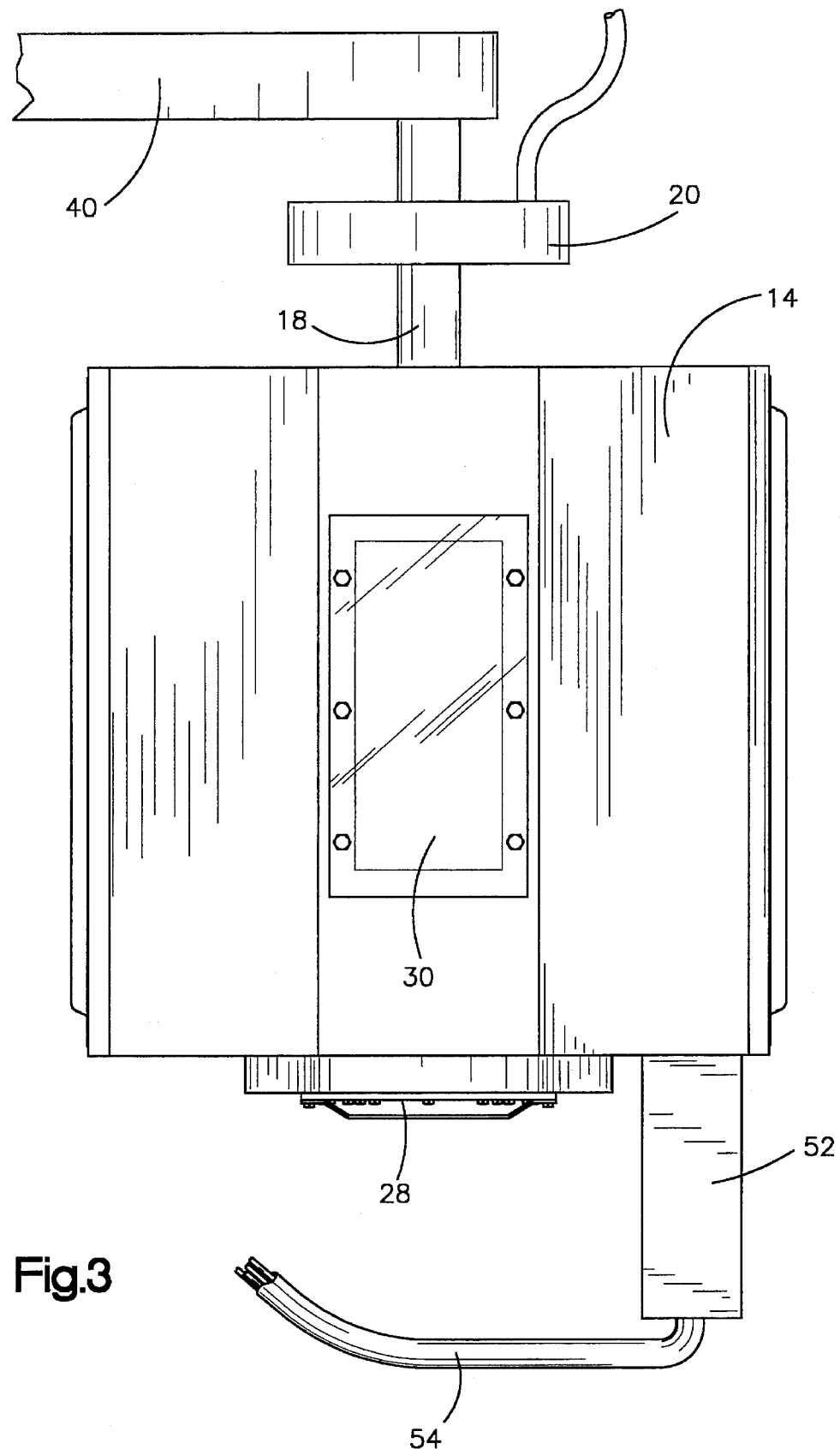
FIG. 3 is bottom plan view of the engine of FIG. 2.
Figure 4:
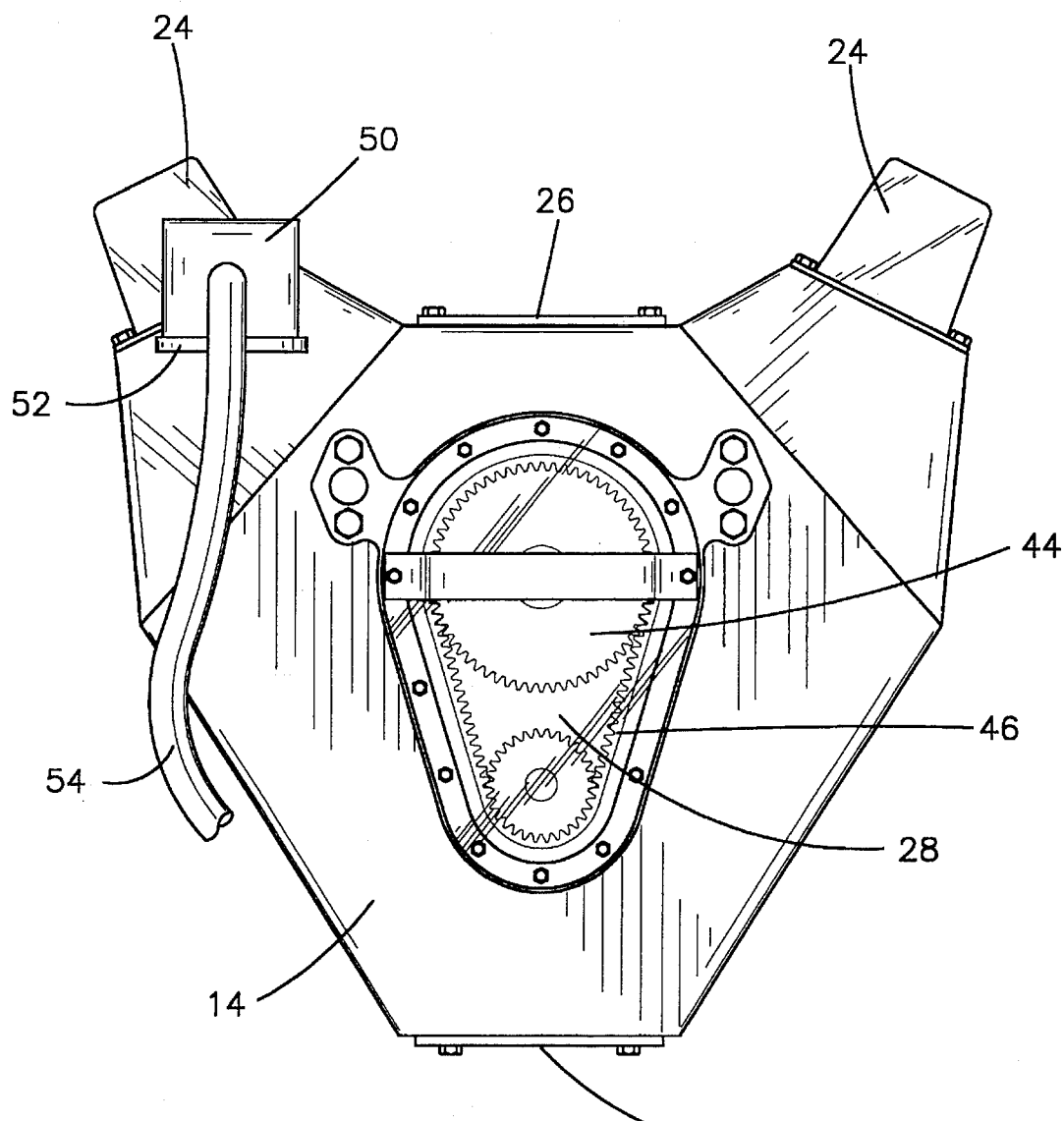
FIG. 4 is a front elevational view of the engine of FIG. 2.
Figure 5:
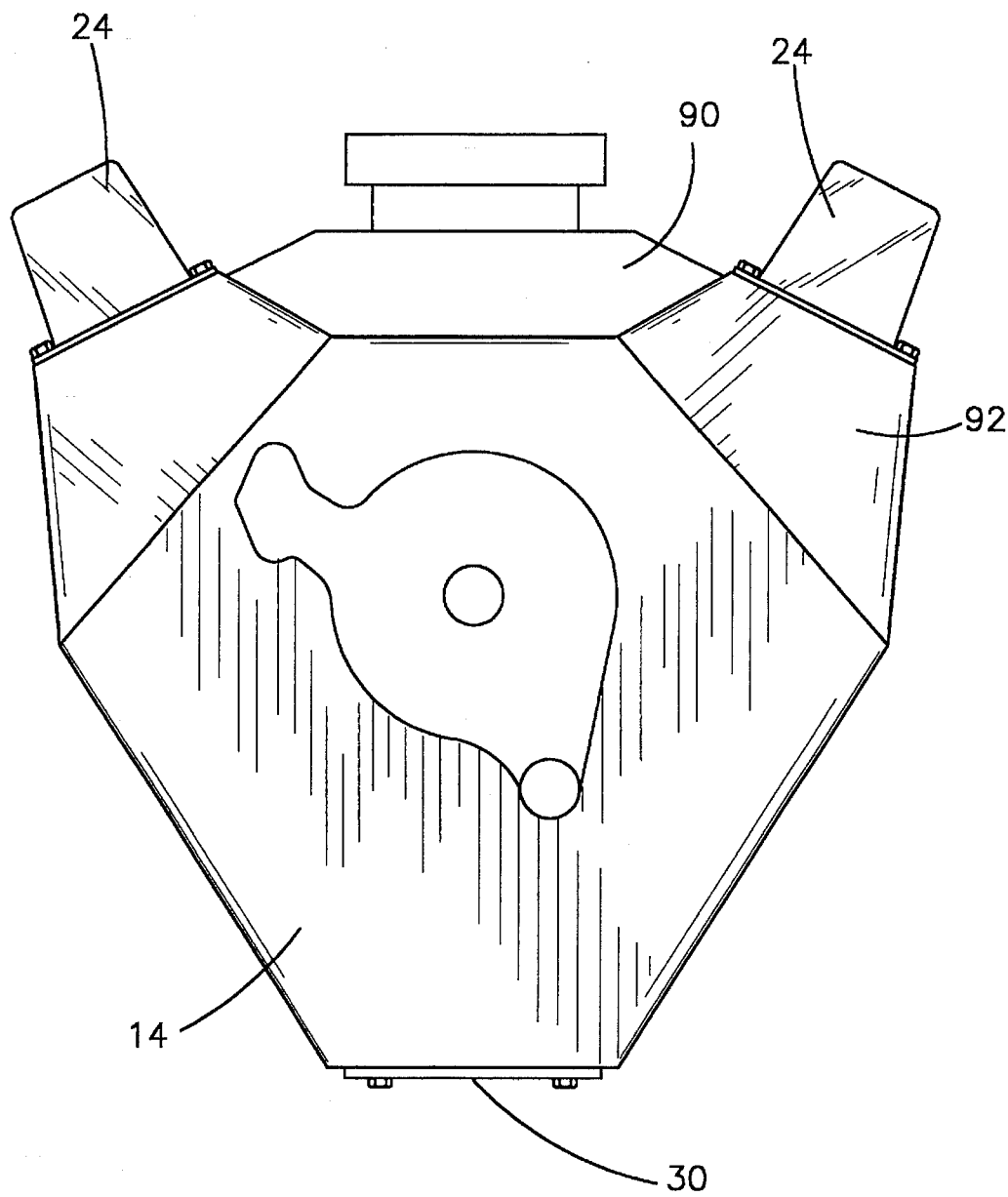
FIG. 5 is a front elevational view of the engine of FIG. 2 with an intake manifold connected thereto.

Referring to FIG. 1, a first embodiment of the engine tester 10 includes a stand 12 for supporting an engine 14, and electric motor 16 coupled to the stand 12. The tester 10 further includes a torque and speed sensor 20 connected to an end portion of a crankshaft 18 of the engine 14 for measuring the torque required to rotate the engine 14. A clutch 22 is preferably mounted between the motor 16 and the engine 14 for selectively uncoupling the motor 16 from the engine 14. The engine 14 includes windows 24, 26, 28, 30 positioned to permit observation and analysis of the internal engine parts and fluids. The engine tester 10 allows engine parts to be tested at all engine operating speeds and under substantially normal conditions.

The stand 12 includes a steel frame 32 for supporting the engine 14 and the motor 16. The stand 12 is preferably mounted on wheels 33 for mobility and is adapted to support various pieces of test equipment. The motor 16 is fixed to a base portion 34 of the stand 12 and the engine 14 is mounted on the frame 32 in an elevated position. The stand 12 includes a control panel (not shown) having switches for controlling the motor 16.

With the prototype which has been constructed, a 300 hp motor equipped with a modified speed control for quick speed control is provided. A Tosvert G-2 start up made by Toshiba Houston International is used. A field transformer supplied by a division of Metex of Edison, N.J. is used to provide power to the motor.

The motor 16 is selected to match the size and type of engine to be tested. To rotate modern racing engines at normal operating speeds up to approximately 15000 r.p.m., a 250 horsepower or larger motor 16 is required. Where high startup torque and rapid stopping are desired, a D.C. motor is preferred. Otherwise, an A.C. variable frequency motor is satisfactory and is generally less costly. An output shaft 38 of the motor 16 is connected to the crankshaft 18. In the preferred and illustrated embodiment, a transmission apparatus 40 connects the crankshaft 18 to the motor shaft 38. The clutch 22 is provided for selectively uncoupling the engine 14 from the motor 16. A hydraulically actuated clutch is preferred.

The transmission 40 is preferably a v-belt drive where the engine will be driven below approximately 5000 r.p.m. However, where the engine is to be rotated at high speeds of approximately 15,000 r.p.m., a metal timing chain is preferred. A gear drive is preferred, where the engine is to be tested at intermediate speeds of approximately 8,500 r.p.m.

The torque and speed sensor 20 is used to detect the torque required to rotate the engine and the speed of the crankshaft 18. The sensor 20 is connected to a torque and horsepower measuring mechanism 21. The mechanism used is a commercially available LEBOW (trademark) model 1605-2K manufactured by Eaton Corporation of Troy Mich. The sensor 20 measures the torque applied to the crankshaft 18. Horsepower is calculated electronically by the mechanism 21 based on the torque measurement. Displays are provided for torque, R.P.M and horsepower. The mechanism 21 thus displays a close approximation of the friction power of the engine 14 being rotated which, when the engine is motored by the motor 16, represents the frictional losses incurred by an engine. The friction power includes the power required to overcome friction in the bearings of the engine and between the piston and cylinder walls, the power required to operate such components as camshafts, oil and water pumps, and fans, in addition to the pumping work done in drawing in fuel charges and expelling exhaust gasses.

One of the most useful features of the engine tester is the ability to test an individual component of a rotating engine. For example, horsepower measurements are taken with a given set of valve springs installed in the engine. Then, the valve springs are replaced with a different set. A new set of horsepower readings is then taken to determine whether the valve springs changed the friction power of the engine.

The engine tester 10 permits observation and optical measurement capability for any engine part which can be illuminated. For this purpose, the plexiglass windows 24, 26, 28, 30 are provided on the engine 14 at several locations. In the preferred embodiment, the vane covers are preferably made of plexiglass to form the window 24. The intake manifold has been removed and replaced by the window 26. The window 28 covers a timing sprocket 44 and timing chain 46 of the engine 14. The window 30 covers the bottom of the engine sump.

Optical measurements are made with a commercially available measurement device known as an OPTRON (trademark of the Optron Corporation of Woodbridge, Conn.) tester. The OPTRON device is a non-contacting displacement follower which is sensitive to the motion of a half-light, half-dark target. The OPTRON device produces output signals which are a measure of target displacement and velocity. When a part is to be optically measured, it is painted white and its background is painted black or vice versa such that a reflective/nonreflective contrasting target is provided. A lens 50 of the OPTRON device is directed at the part through the relevant window such that light reflected from the target is captured by the OPTRON device. The outputs of the OPTRON device are preferably displayed on an oscilloscope. Thus, a technician may view one display representing the displacement of the part and another display representing the velocity of the part.

The OPTRON device 48 measures motion relative to its lens 50. Therefore, it is preferable to mount the lens 50 on the engine 14 with a rigid lens mounting bracket 52. Thus, the lens 50 will vibrate with the engine 14 and the vibrations will not affect the measurements. That is, the relative displacement measured will be that between the part being measured and other parts of the engine 14. Light signals from the lens 50 are carried through a flexible optical fiber bundle 54 to a remote transducer unit 56. The lens is preferably mounted on an adjustable stage so that it can be readily moved small distances without having to re-mount it. Fiber optic bundles may also be routed inside the engine to illuminate and measure the motion of parts which cannot be conveniently targeted through a window.

The testing apparatus 10 is useful for testing the peak pressure speed of an engine. In most piston engines, the output torque increases, peaks, and then decreases with increasing engine speed. The peak torque speed corresponds to thee speed at which pressure in the cylinders is maximized. To measure peak pressure speed, pressure gauges 57 are connected to the spark plug openings in the engine 14 to measure cylinder pressure. The engine 14 is then rotated at various speeds until maximum pressures are recorded for the cylinders. Engine designers may then work on ways to improve the engine design by increasing the peak pressure speed. For example, one factor limiting the pressure in the cylinders is the resistance to flow through the intake passages. In general, if the flow resistance into the cylinder can be decreased, the peak pressure speed can be increased.

The engine testing apparatus 10 is further useful for testing the flow pattern of a fuel/air mixture into the cylinders. When flow patterns within an intake manifold are to be observed, windows are built into the intake manifold or a transparent manifold 90 is used. Color is added to the air or fuel to make the mixture visible. For example, colored smoke may be generated and directed toward the engine air intake or dye may be added to the fuel. It is preferred that mineral spirits be used as a fuel substitute when performing this test to avoid the possibility of combustion.

When the engine 14 is rotated, the flow patterns of the fuel air mixture may be observed to detect, for example, flow restrictions and turbulence. By eliminating restrictions and flow impediments such as sharp corners in the flow path, the efficiency of the engine can be increased and the peak pressure speed can be increased. The engine tester 10 is used to measure the friction power both before and after any changes are made to the intake manifold 90 to determine whether the efficiency has been increased. Other parts in the intake or exhaust path may be similarly tested.

Figures 6, 7:
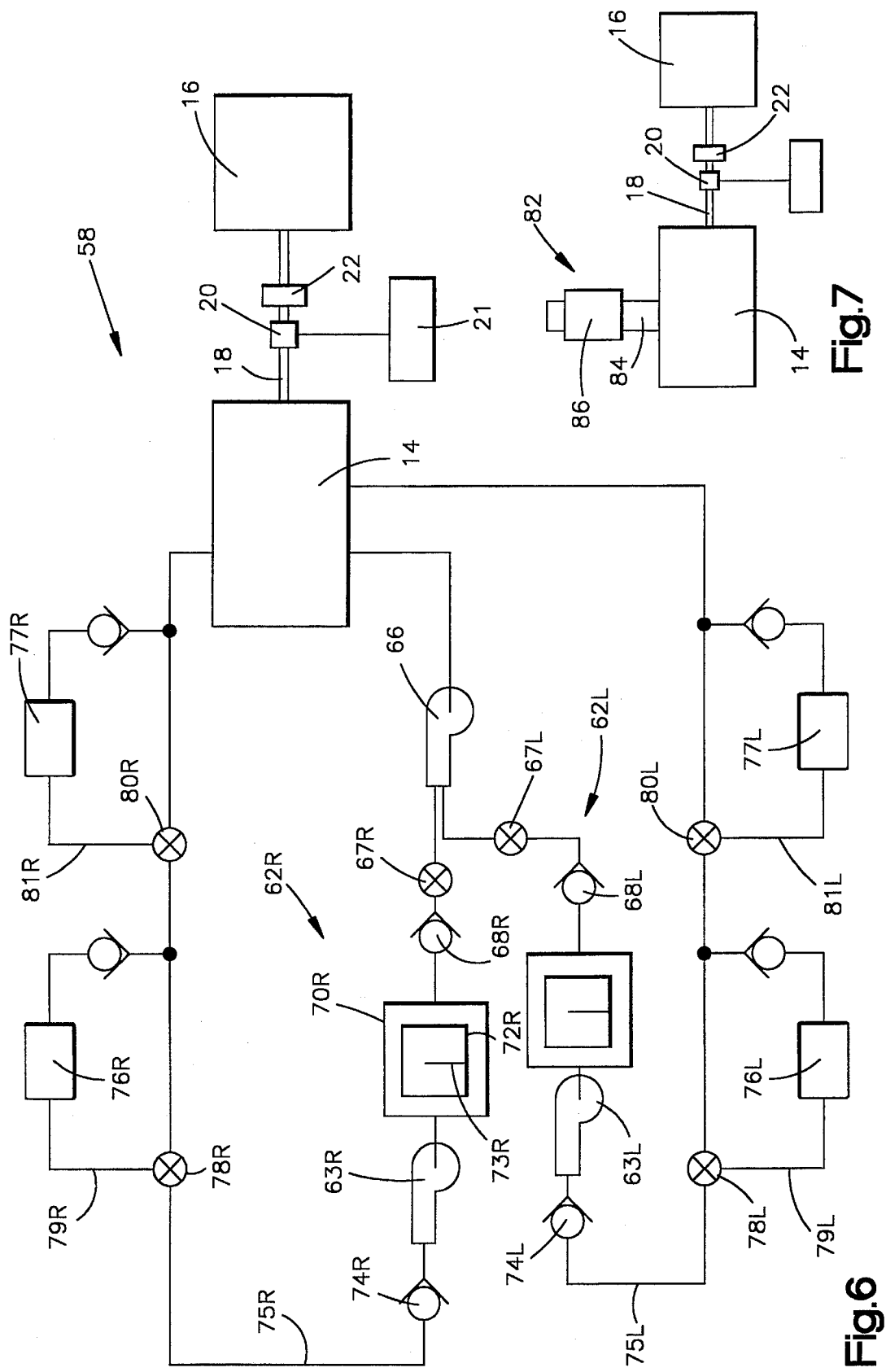
FIG. 6 is a schematic diagram of the oil foam viewing system of the engine tester.
FIG. 7 is a schematic diagram of the air flow measuring apparatus of the engine tester.

Referring to FIG. 7, the engine tester apparatus includes an air flow measuring device 82 for measuring the air flow rate through the combustion chambers while the engine 14 is being rotated. The flow measuring device 82 includes an air flow conduit 84 adapted to be connected in an airtight manner to the intake manifold of the engine 14 being tested. The conduit 84 includes internal structure, not shown, delineated a series of small, parallel passages 87 which produce laminar flow. The conduit 84 is connected to a unique airflow meter 86 FIG. 7, forming a part of the device 82 for measuring the rate of flow of air through the conduit 84. The device 82 may also measure the flow rate of air being exhausted by the engine 14. To do this, the conduit 84 is connected to the exhaust manifolds of the engine 14 in an airtight manner. To measure the flow through one cylinder, the conduit is connected to the intake port for that cylinder only. The conduit 84 is connected to the intake port of a carburetor to determine the flow rate of air when a mixture of fuel and air is being drawn through the engine. Leads 85, FIG. 8, connect the conduit 84 to the meter 86.

A special flow meter was constructed at the request of this patentee by Merriam Instruments of Cleveland, Ohio and is designated as Model No. LFS-2282R. To facilitate the variety of measurements which may be made the meter is portable in order that it may be positioned in proximity to the portion of an engine being tested. A unique characteristic of this instrument is that in addition to measuring volumetric flow of air, it senses the humidity level of the air and ambient temperature and barometric pressure. The unit automatically converts each reading to assumed standard weather conditions, so that readings on tests conducted at different times are not affected by variations in weather conditions.

The engine testing apparatus 10 is further useful for testing the flow pattern of coolant fluid through the cooling path of the engine 14. Windows are built into the cooling jackets or transparent cooling jacket parts 92 are used for observing the flow pattern of coolant. For example, by finding and eliminating restrictions and flow impediments in the coolant path, the engine efficiency can be increased. The tester 10 has been found useful for observation of locations in the coolant path which become starved for coolant at certain speeds. Further a pyrometer 64, shown schematically in FIG. 1, is provided to measure coolant temperatures and then detect hot spots in a cooling system. The engine tester 10 provides a measuring device for measuring the change in friction power for each change made to the coolant path.

The engine tester 10 is also useful for finding the peak pressure r.p.m. of the engine 14. At this number of r.p.m.s, the cylinder pressure as well as the torque output of the engine reach peaks. To perform this test, pressure gauges are connected to the spark plug holes of the engine cylinders. The engine 14 is rotated at varying speeds until the pressure in the cylinders reaches a maximum and the speed at which this occurs is recorded. It has been found that by altering the intake path, the peak pressure speed can be increased thus increasing the engine's efficiency.

The engine tester 10 includes an oil foam testing or monitoring apparatus 8. The oil foam monitoring apparatus provides a safe and effective way to determine the amount of air mixed with the engine oil. Oil which has passed through the lubrication circuit of the engine 14 contains air bubbles which reduce the oil's effectiveness. The bubbles are formed regardless of whether the engine 14 is operating or is rotated externally.

Referring now to FIG. 6, right and left test systems 62R, 62L are shown schematically. The systems respectively include oil pumps 63R, 63L. In the prototype test unit that has been constructed, one of the oil pumps is a conventional General Motors oil pump used on Chevrolet engines, while the other is a Cogsworth AB0052 deaerating pump. Since the system 62R and 62L are identical other than for the pumps, the right or R side system will be described in detail, it being recognized that the left or L side system is otherwise the same.

In the prototype of the described system a sealed engine with a so called "dry sump" is utilized. A pump 66 is provided to draw oil from the sump and direct to one or the other of the systems 62R, 62L depending on the position of selection valves 67R and 67L. Assuming the selection valve 67R is open and the valve 67L is closed, oil from the sump pump 66 will pass through the valve 67R, thence through a check valve 68R to a sight tank 70R. The sight tank 70R includes a window 72R on which graduations are provided, so that an operator may view the contents of the tank 70R and take measurements to determine the volume of air entrained within the lubricating oil.

A baffle 73R separates the tank into two chambers above a given level, so that entrained air tends to be collected on an inlet side of the tank and oil withdrawn from the tank by the oil pump 63R will be substantially free of air. Oil from the oil pump 63R passes through a check valve 74R into a lubrication supply conduit 75R. Wire mesh and paper oil filters 76R, 77R are provided. If oil is to be filtered by the wire mesh filter a valve 78R is positioned to divert oil from the lubrication conduit 75R to a filter supply conduit 79R. When oil is to be filtered by the paper filter 77R a valve 80R is manipulated to divert the flowing oil from the lubrication conduit 75R to a paper filter supply conduit 81R.

With the described lubrication system it is possible to compare the efficiencies of the two oil pumps, the power required to drive them and air entrainment caused by them. In addition, comparison tests can be run on air entrainment induced by different filters. Thus with this system it is possible to determine an optimized combination of pump and filter to provide lubrication with minimized air entrainment and with minimal power losses for driving the oil pump.

Figure 8:
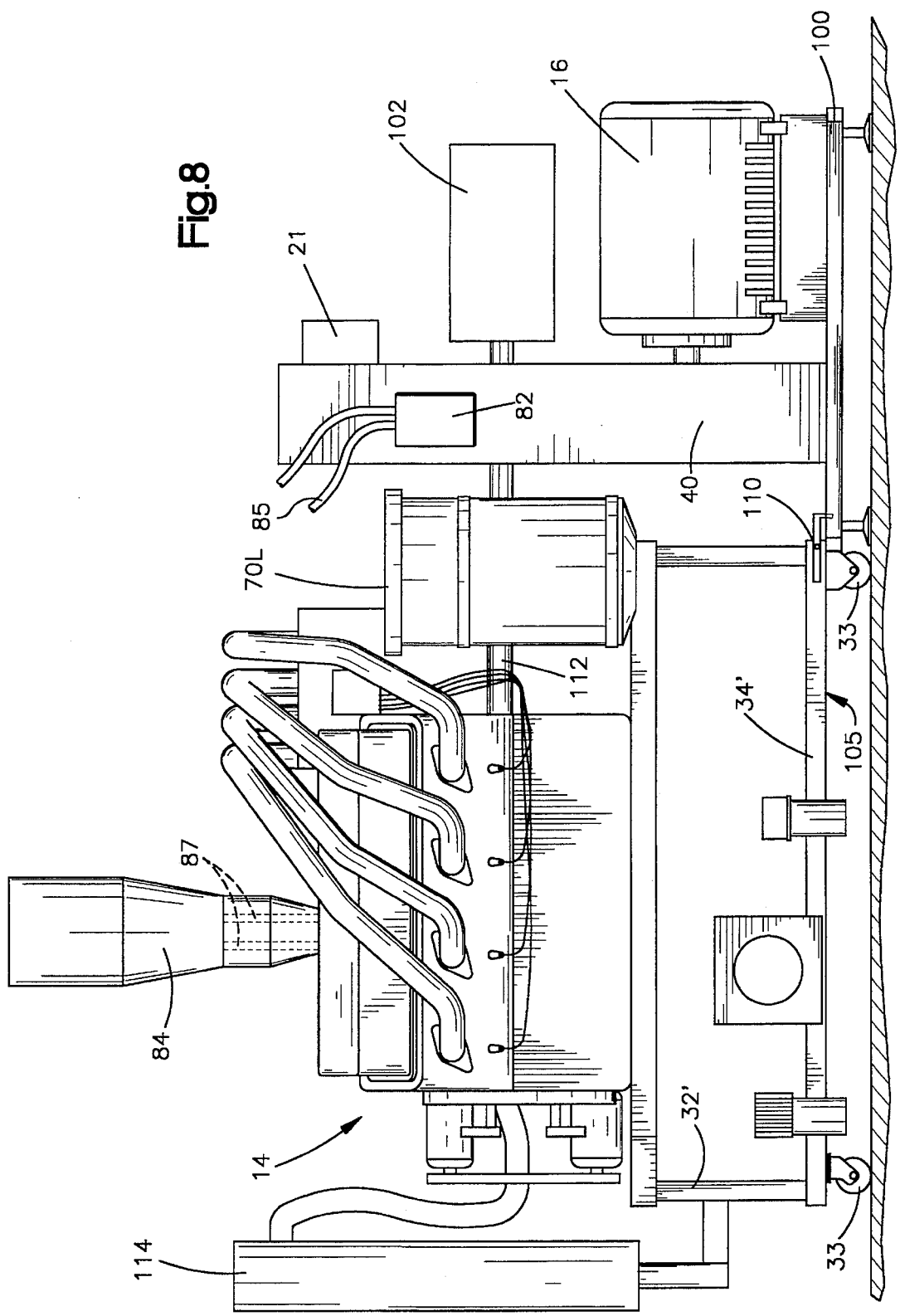
FIG. 8 is a side elevational view of the now preferred test mechanism with one engine support module coupled to the test module; and, FIG. 9 shows the mechanism of FIG. 8 in a decoupled configuration.
Figure 9:
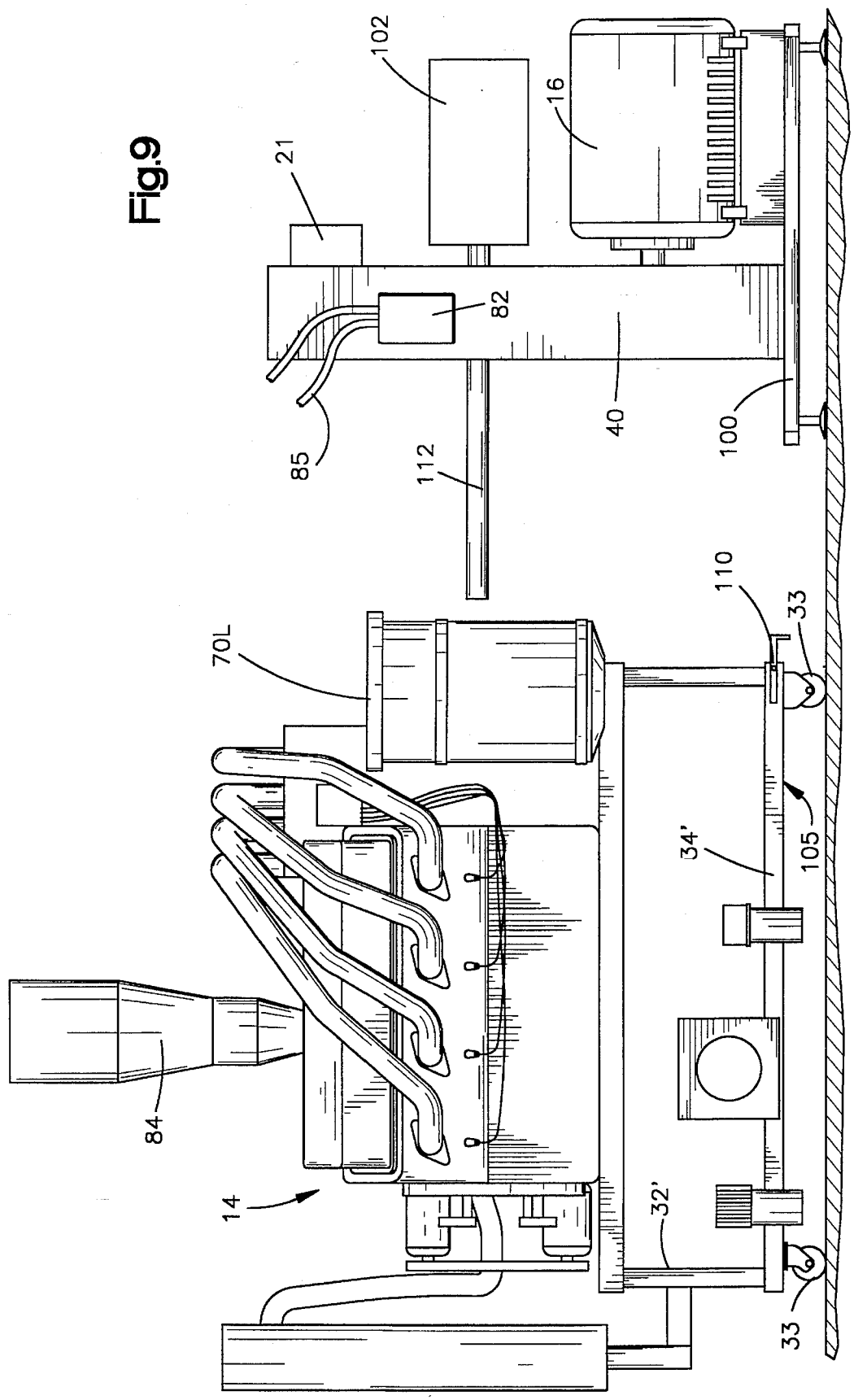

Referring now to FIGS. 8 and 9, the preferred test apparatus is depicted. A motor module 100 is provided which supports the motor 16. A dynamometer 102 is provided so that an engine under test may be either driven by the motor 16 or operated with the dynamometer 102 in a conventional manner.

A mobile engine support module 105 is provided. The mobile support module 105 is releasably connected to the motor module 100 by releasable latches 110. A driving connection between the engine 14 and the transmission 40 is accomplished through a splined shaft 112 which engages a flywheel of the engine 14 in conventional manner.

As viewed in FIGS. 8 and 9, the engine 14 is equipped with a coolant tower which functions in lieu of a radiator. While preferred embodiments of this invention have been described in detail, it will be apparent that certain modifications or alterations can be made without departing from the spirit and scope of the invention set forth in the appended claims.

I claim:

1. A method of identifying components for an optimized internal combustion engine lubrication system comprising:

a) delivering oil from an engine sump to a collection tank as the relatively moveable components of the engine traverse motions corresponding to motions traversed when the engine is operating for its intended use;

b) pumping oil with a pump from the tank to a lubrication system of the engine for lubrication of at least certain of the moveable parts;

c) at selected times passing the oil through a first filter of a first type;

d) discontinuing the passing of the oil through the first filter and thereafter passing oil through a second filter of a type different than the first;

e) periodically measuring the volume of air and oil in the tank to enable a determination of the amount of air entrained in the oil; and, f) comparing measurements resulting from the periodic measuring step and thereby determining the relative entrained air volumes respectively produced by the first and second filters.

2. The process of claim 1 wherein the tank is a sight tank.

3. The process of claim 1 wherein one filter is oil mesh and the other includes a filtering media made from an organic material.

4. The process of claim 3 wherein said other filter is a paper filter.

5. A method of identifying components for an optimized internal combustion engine lubrication system comprising:
   a) delivering oil from an engine sump to a selected one of a pair of collection tanks as the relatively moveable components of the engine traverse motions corresponding to motions traversed when the engine is operating for its intended use;
   b) pumping oil with a first pump from one of the tanks to a lubrication system of the engine for lubrication of at least certain of the moveable parts;
   c) at other times pumping oil with a second pump of a type different than the first pump from the other tank to the lubrication system of the engine for lubrication of said at least certain of the moveable parts;
   d) at selected times passing the oil through a first filter of a first type;
   e) discontinuing the passing of the oil through the first filter and thereafter passing oil through a second filter of a type different than the first;
   f) periodically measuring the volume of air and oil in the tanks to enable a determination of the amount of air entrained in the oil; and,
   g) comparing measurements resulting from the periodic measuring step and thereby determining the relative entrained air volumes respectively produced by the first and second pumps and the first and second filters.

6. The process of claim 5 wherein the collection tanks are sight tanks.

7. The process of claim 5 wherein the first filter is oil mesh and the second filter includes a filtering media made from an organic material.

8. The process of claim 7 wherein said second filter is a paper filter.

9. A test mechanism for analyzing internal combustion engine components comprising:
   a) a test module supporting components for use in analyzing an engine;
   b) a plurality of engine support dolly modules selectively coupleable to the test module one at a time and adapted to support components for testing an engine;
   c) releasable means for selectively fixing the test module and a selected engine support module in coupled relationship; and,
   d) the supported components including:
      i) an electric motor of sufficient power to motor engines to be tested at rotational speeds corresponding to speeds at which an engine under test can be operated when such engine is operated when in use for its intended purpose;
      ii) an air flow measuring device for measuring a selected one of intake and exhaust air and providing air flow readings adjusted to standardized conditions;
      iii) an optical measuring device for measuring component movements;
      iv) an air entrainment measuring system for measuring a volume of air entrained in lubricating oil;
      v) a system for measuring temperatures and pressures at locations within the engine; and,
      vi) a horsepower and torque measuring mechanism.

10. The test mechanism of claim 9 wherein the components include a dynamometer.

11. The test mechanism of claim 9 wherein the air entrainment measuring system includes a sight tank.

12. The test mechanism of claim 9 wherein the air flow measuring device includes a set of parallel tubes for producing laminar flow of intake air.

13. The mechanism of claim 9 wherein the optical measuring device includes a fiber light conduit whereby to isolate the measuring device from engine vibrations.

14. An apparatus for testing internal combustion engines comprising:
   an engine to be tested;
   a support structure for supporting said engine, said engine having an output shaft;
   an electric motor supported by said support structure and having an output shaft adapted to couple with said engine output shaft for rotating said engine at speeds throughout said engine's ordinary operating speed range;
   an air entrainment measuring system including an oil tank carried by said support structure for receiving oil from said engine, said tank having a window for observing the degree of bubble formation in said oil during rotation of said engine;
   an engine output conduit connecting said engine to said tank such that oil may flow from the engine to the tank and an engine supply conduit connecting said tank to said engine to supply oil from the tank to said engine; and,
   a pump for pumping oil from the tank to the engine.

15. An apparatus for testing internal combustion engines comprising:
   a) a stand for supporting an engine, such engine having an output shaft;
   b) an electric motor supported by said stand having an output shaft adapted to couple with such engine output shaft for rotating such engine at speeds throughout such engine's ordinary operating speed range;
   c) a conduit connected in an airtight manner to at least one intake port of such engine;
   d) a flow meter for measuring the air flow through the conduit and into the combustion chamber associated with said intake port while such engine is being rotated by said motor; and,
   e) the flow meter including means to provide output readings adjusted to standard weather conditions whereby variations in temperature, humidity and barometric pressure from one test to another do not affect output measurements.

16. A portable apparatus for testing internal combustion engines comprising:
   a) a frame structure for supporting one of such engines, said frame including wheels for transporting said apparatus;
   b) a motor supported by said frame structure and having a rotatable output shaft;
   c) a drive train adapted to couple said output shaft to the drive shaft of such engine, said drive train including a transmission means and a clutch;
   d) torque speed and power sensing means for sensing the approximate torque applied to the drive shaft of such engine and for sensing the speed of the drive shaft to enable the calculation of the power required to drive such engine;

e) an electronic calculating unit connected to said torque and speed sensing means for calculating and displaying horsepower based on sensed speed and torque wherein said motor is adapted to rotate such engine such that the friction power required by such engine is displayed by said unit for speeds throughout the ordinary speed range of said engine;

f) window means adapted to form a cover for portions of such engine for observing selected inner portions of such engine while such engine is being rotated;

g) an optical displacement measuring device for producing a visual representation through the window means of the displacement of a selected part by electronically monitoring light signals reflected from such selected part and transmitted through said window means;

h) said optical displacement measuring device including an optical fiber light conduit for transmitting light from such selected part to said device and wherein one end of said conduit is attachable to such engine such that said one end is caused to vibrate in synchronism with such engine;

i) an oil tank for connection to such engine for receiving lubricating oil from such engine, said tank having a window for observing the degree of bubble formation in such oil caused by rotation of such engine;

j) a conduit for connection in an airtight manner to at least one intake port of such engine; and, k) a flow meter for measuring the air flow through the conduit and into a combustion chamber associated with said intake port while such engine is being rotated by said motor.

17. A portable apparatus for testing internal combustion engines comprising:

a) a frame for supporting one of such engines, said frame including wheels for transporting said apparatus;

b) a base, the frame being removably connectable to the base;

c) a motor supported by said base and having a rotatable output shaft;

d) a drive train adapted to couple said output shaft to the drive shaft of such engine, said drive train including a transmission means and a clutch;

e) torque speed and power sensing means for sensing the approximate torque applied to the drive shaft of such engine and for sensing the speed of the drive shaft and measuring the power required to drive such engine;

f) an electronic calculating unit connected to said torque and speed sensing means for calculating and displaying horsepower based on sensed speed and torque wherein said motor is adapted to rotate such engine such that the friction power required by such engine is displayed by said unit for speeds throughout the ordinary speed range of said engine;

g) window means adapted to form a cover for portions of such engine for observing selected inner portions of such engine while such engine is being rotated;

h) indicator means connected to the torque, speed and power sensing means for receiving signals from the speed and power sensing means and indicating the magnitude of said power;

i) an optical displacement measuring device for producing a visual representation through the window means of the displacement of a selected part by electronically monitoring light signals reflected from such selected part and transmitted through said window means;

j) said optical displacement measuring device including an optical fiber light conduit for transmitting light from such selected part to said device and wherein one end of said conduit is attachable to such engine such that said one end is caused to vibrate in synchronism with such engine;

k) an oil tank for connection to such engine for receiving lubricating oil from such engine, said tank having a window for observing the degree of bubble formation in such oil caused by rotation of such engine;

l) a conduit for connection in an airtight manner to at least one intake port of such engine; and, m) a flow meter for measuring the air flow through the conduit and into a combustion chamber associated with said intake port while such engine is being rotated by said motor.

18. A method of improving the performance of an internal combustion engine comprising the steps of:

a) connecting an output shaft of the engine to an output component of an electric motor of a size sufficient to rotate the shaft through a speed range substantially equal to the speed range of the engine when operated to produce output power;

b) equipping the engine with a window positioned to permit performance observation of a selected engine component;

c) providing a reflective/non-reflective contrast between said selected component and its background;

d) mounting a lens of an optical displacement measuring means rigidly to said engine such that said lens receives light transmitted by said window;

e) driving the engine with the motor while measuring the displacement of the selected component with said optical displacement measurement means to collect a first set of empirical engine performance data at observed speeds of engine rotation;

f) modifying the selected component;

g) again driving the engine with the motor;

h) collecting further empirical data while the engine is driven at speeds corresponding to said observed speeds;

i) comparing the further data with the first set to determine whether one of the selected and modified components is superior to the other;

j) mounting a pressure gauge in communication with a cylinder of said engine such that the gauge records the pressure in said cylinder;

k) rotating said engine with the motor at selected speeds throughout the normal operating range of said engine;

l) measuring and recording the pressure of the cylinder for each of said selected speeds;

m) determining the engine speed at which the pressure within said cylinder reaches a maximum;

n) providing an intake flow path of said engine with a transparent portion to permit observation of at least a portion of said intake path;

o) providing a source of colored vapor which is readily visible to the human eye;

p) rotating said engine throughout its ordinary speed range while introducing said vapor into the intake path of said engine; and, q) observing the flow pattern of said vapor through the intake flow path.

19. The method of claim 18 further including identifying components for an optimized internal combustion engine lubrication system with the following steps:

a) delivering oil from a sump of the engine to a collection tank as the relatively moveable components of the engine traverse motions corresponding to motions traversed when the engine is operating for its intended use;

b) pumping oil with a pump from the collection tank to a lubrication system of the engine for lubrication of at least certain of the moveable parts;

c) at selected times passing the oil through a first filter of a first type;

d) discontinuing the passing of the oil through the first filter and thereafter passing oil through a second filter of a type different than the first;

e) periodically measuring the volume of air and oil in the tank to enable a determination of the amount of air entrained in the oil; and, f) comparing measurements resulting from the periodic measuring steps and thereby determining the relative entrained air volumes respectively produced by the first and second filters.

20. A method of identifying components for an optimized internal combustion engine lubrication system comprising:

a) delivering oil from an engine sump to a selected one of a pair of collection tanks as the relatively moveable components of the engine traverse motions corresponding to motions traversed when the engine is operating for its intended use;

b) pumping oil with a first pump from one of the tanks to a lubrication system of the engine for lubrication of at least certain of the moveable parts;

c) at other times pumping oil with a second pump of a type different than the first pump from the other tank to the lubrication system of the engine for lubrication of said at least certain of the moveable parts;

d) periodically measuring the volume of air and oil in the tanks to enable a determination of the amount of air entrained in the oil; and, e) comparing measurements resulting from the periodic measuring step and thereby determining the relative entrained air volumes respectively produced by the first and second pumps.

21. The process of claim 20 wherein the collection tanks are sight tanks.

22. A method of improving the performance of an internal combustion entwine comprising the steps of:

a) connecting an output shaft of the engine to an output component of an electric motor of a size sufficient to rotate the shaft through a speed range substantially equal to the speed range of the engine when operated to produce output power;

b) equipping the engine with a window positioned to permit performance observation of a selected relatively movable engine component;

c) driving the engine with the motor while observing movement the selected component relative to other engine components to collect a first set of empirical engine performance data at observed speeds of engine rotation;

d) modifying the selected component;

e) again driving the engine with the motor;

f) collecting further empirical data while the engine is driven at speeds corresponding to said observed speeds;

g) comparing the further data with the first set to determine whether one of the selected and modified components is superior to the other; and, h) introducing colored vapor into the engine as it is driven and observing the vapor within the engine through a viewing window secured to the engine.

23. The method of claim 22 further including the steps of positioning a lens to view the selected component under study and transmitting images of the selected component via flexible fiber optics from the lens to an analyzing unit.

24. The method of claim 23 wherein the lens is positioned internally of the engine and the fiber optics extend from the lens to the analyzing unit at a location external of the engine.

* * * * *